United States Patent [19]
Genuit et al.

[11] 3,781,636
[45] Dec. 25, 1973

[54] LEAD NETWORK TO PREVENT VOLTAGE OVERSHOOT IN A SWITCHING REGULATOR

[75] Inventors: Luther L. Genuit, Scottsdale; John R. Nowell, Phoenix, both of Ariz.

[73] Assignee: Honeywell Information Systems Inc., Waltham, Mass.

[22] Filed: Apr. 30, 1973

[21] Appl. No.: 356,025

[52] U.S. Cl. .................... 321/9 R, 321/11, 321/18, 321/43, 321/455
[51] Int. Cl. ............................................ H02m 1/12
[58] Field of Search .................... 321/2, 9, 11, 18, 321/43

[56] References Cited
UNITED STATES PATENTS

| | | |
|---|---|---|
| 3,573,597 | 4/1971 | Genuit et al. ............................ 321/2 |
| 3,691,412 | 9/1972 | Hedman ................................ 321/18 |
| 3,697,854 | 10/1972 | Berger .................................. 321/18 |
| 3,707,684 | 12/1972 | Nowell .................................. 330/9 |

Primary Examiner—William M. Shoop, Jr.
Attorney—Lloyd B. Guernsey

[57] ABSTRACT

Voltage overshoot is prevented by coupling the voltage from the input lead of the filter circuit to an error amplifier. A capacitor, resistors and diode provide coupling while the voltage at the input lead of the filter circuit is increasing and prevent instability in the circuit. The voltage from the output lead of the filter circuit is also connected to the error amplifier to provide the normal control voltage.

4 Claims, 6 Drawing Figures

LEAD NETWORK TO PREVENT VOLTAGE OVERSHOOT IN A SWITCHING REGULATOR

CROSS-REFERENCE TO RELATED APPLICATIONS Apr.

A detailed description of the operation of the error amplifier may be found in the U.S. Pat. No. 3,707,684 by John R. Nowell, entitled "Error Amplifier for Use with a Switching Regulator". A more detailed description of the operation of the switching regulator can be found in the U.S. Pat. No. 3,573,597, by Luther L. Genuit and John R. Nowell, issued Ap. 6, 1971, entitled "High Current Switching Regulator with Overlapping Current Output Pulses".

BACKGROUND OF THE INVENTION

This invention relates to lead networks to prevent voltage overshoot in a switching regulator and more particularly to a network which uses a capacitor, a diode and a plurality of resistors to provide a lead voltage to an error amplifier. The lead network is connected to the input lead of the filter circuit and to the input lead of the amplifier. The input lead of the amplifier is also connected to the output lead of the filter circuit.

In high speed data processing systems switching regulators may be used to provide D.D. power to electronic circuits in the system. These regulators are smaller and more efficient than prior art power supplies so that the regulators may be located in the cabinets which contain the circuits rather than in a separate cabinet as required when prior art power supplies are used. Location of regulators near the circuits greatly reduces the length of cables which distributes the current to the circuits and reduces the amount of error signals which may be caused by variations in voltage in long cables.

The switching regulator may employ a pair of transformers, a pair of silicon controlled rectifiers and a source of signals to convert an unregulated D.C. voltage, such as 150 volts, to an accurately regulated voltage such as five volts. The silicon controlled rectifiers are employed as switches between the source of unregulated D.C. voltage and the transformers. The silicon controlled rectifiers are located on the "high" voltage side of the transformer where the current and power losses in these rectifiers are low, thereby causing the switching regulator to have a high degree of efficiency The regulated D.C. voltage obtained from the secondary windings on the transformers is supplied to a pair of voltage output terminals. The transformers provide isolation between the regulated D.C. voltage and the source of unregulated D.C. voltage so that a short circuit in the silicon controlled rectifier will not cause damage to the microcircuit modules which provide the load on the switching regulator.

The silicon controlled rectifier is a semiconductor device having an anode, a cathode and a gate. The silicon controlled rectifier can be used as an ON-OFF switch which can be turned on in a very few microseconds. Normally the silicon controlled rectifier cannot conduct current between anode and cathode thereof until a pulse of current larger than a threshold value flows from gate to cathode. If a positive voltage difference exists between the anode and cathode when a pulse of current flows into the gate, the silicon controlled rectifier "fires", i.e., is rendered conductive and a current will flow from the anode to the cathode. The rate at which the current flow from anode to cathode increases when the silicon controlled rectifier fires must be limited to prevent damage to the rectifier. Once anode-cathode flow commences, the gate has no further control over such current flow. Current flow from anode to cathode in a rectifier can be terminated only by reducing the anode to cathode current below a "holding" or minimum current value. A more detailed description of the operation of a silicon controlled rectifier can be found in the "Silicon Controlled Rectifier Manual", 4th Edition, 1967, published by the General Electric Company, Syracuse, New York.

A signal source is coupled to the voltage output terminal of the switching regulator and develops trigger signals whose frequency is determined by the value of voltage between the voltage output terminals. The trigger signals are coupled to the silicon controlled rectifiers in the switching regulator and cause these rectifiers to deliver energy through the transformers to filter capacitors which are connected to the voltage output terminals. The signal source senses any change in the value of any regulated output voltage and causes a change of frequency in the trigger signals delivered to the switching regulator.

The signal source includes an error amplifier, a rate generator and a trigger generator. The error amplifier develops a current having a value which is determined by the voltage at the output terminals of the switching regulator. This current is applied to the rate generator which develops pulses having a frequency which is determined by the value of current from the error amplifier. The pulses from the rate generator are applied to the trigger generator which develops trigger signals which are applied to the gates of the silicon controlled rectifiers in the switching regulator. When the values of current which are required in a portion of a data processing system is greater than can be delivered by a single switching regulator two or more switching regulators may be connected in parallel to provide the required current. A single error amplifier, a single rate generator and a trigger generator may be used to control the operation of more than one switching regulator.

A filter circuit which includes an inductor or choke and a pair of capacitors is connected to the output leads of the regulators to aid in providing a constant value of output voltage from the regulators. The inductance of the choke causes the voltage at the output lead of the filter circuit to increase more slowly than the voltage at the input lead of the filter when the power is initially applied to the switching regulator. The lower output voltage causes the regulator to continue to deliver current to the input lead of the filter and causes the input voltage to "overshoot" or rise above the normal regulated value of output voltage while the value of the output voltage is still below the regulated value. The higher input voltage and the inductance of the choke cause the output voltage to rise above the regulated value. This higher value of voltage may trip an overvoltage relay and cause the input voltage to the switching regulator to be removed or it may cause damage to microcircuits in the data processing system. What is needed is a circuit which prevents the input voltage of the filter from rising above the normal regulated value of voltage used in the data processing system. The present invention uses a lead network to prevent overshoot above the regulated value of voltage.

It is, therefore, an object of this invention to provide a means for preventing voltage overshoot in a switching regulator.

Another object of this invention is to provide a lead network which prevents overshoot in a switching regulator.

A further object of this invention is to provide a lead network which prevents overshoot of the regulated value of output voltage without affecting the D.C. regulation of the output voltage.

Still another object of this invention is to provide a lead network which prevents overshoot of the regulated value of output voltage without affecting the stability of the switching regulator.

SUMMARY OF THE INVENTION

The foregoing objects are achieved in the present invention by providing a lead network to prevent voltage overshoot at the output terminals of a switching regulator. A capacitor, a diode and resistors provide a lead voltage to an error amplifier during the time the voltage is increasing. The lead network is connected between the input lead of the filter circuit and the error amplifier. The error amplifier is also connected to the output lead of the filter circuit to provide the normal control voltage.

DESCRIPTION OF THE POWER SUPPLY SYSTEM

Figure 1:
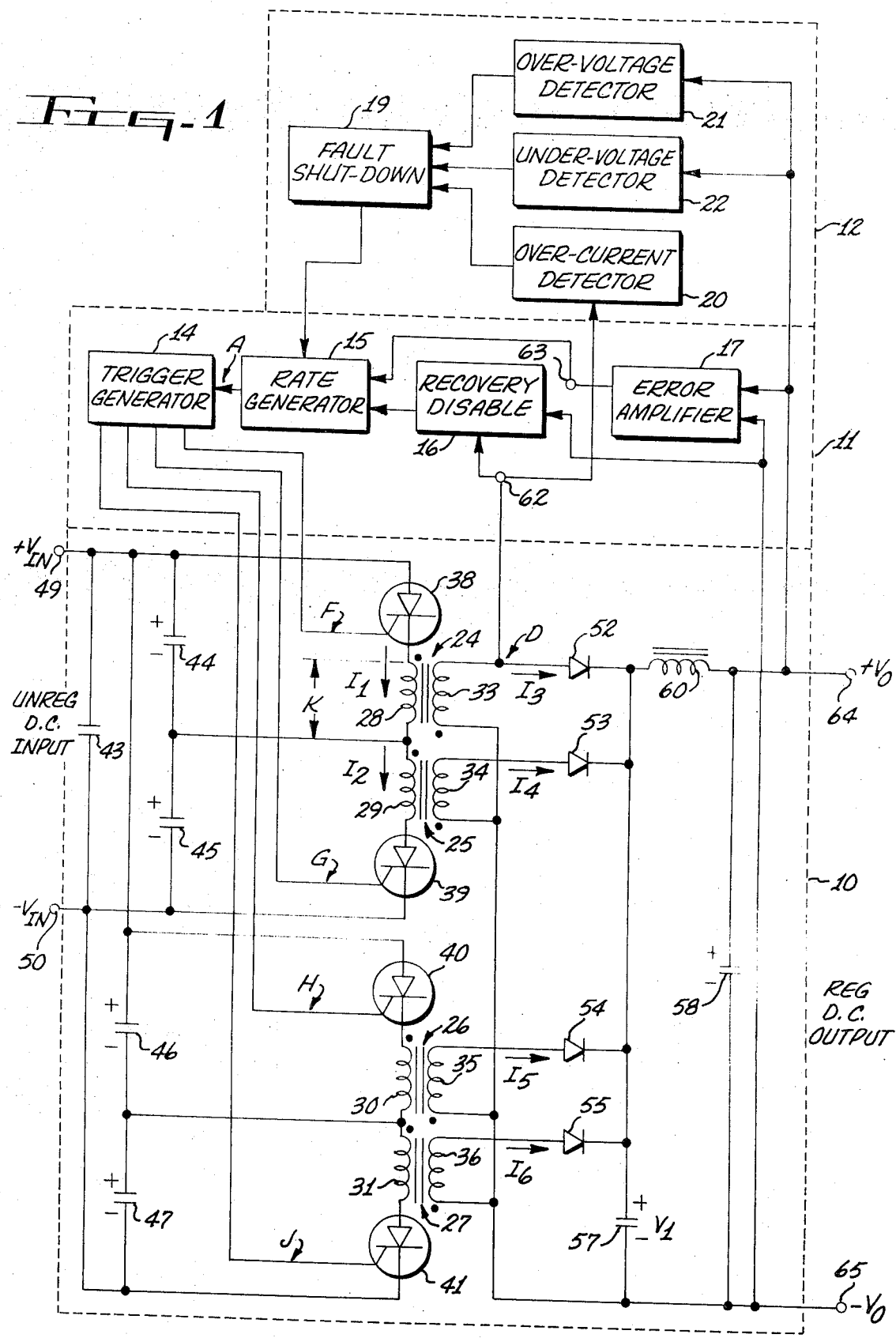
FIG. 1 is a schematic of a dual switching regulator and its associated control circuits.

Referring more particularly to the drawings by the characters of reference, FIG. 1 discloses a power supply system which is designed to provide a constant supply of D.C. output voltage for a wide range of values of output current and for monitoring the current delivered to a load which may be connected to the system. As indicated in FIG. 1, the system comprises a dual switching regulator 10, a switching regulator control circuit 11 for providing trigger signals to switching regulator 10, and a circuit 12 for monitoring the current and voltage delivered by the power supply. The switching regulator control circuit 11 comprises a counter and trigger generator 14, a rate generator 15, a recovery disable circuit 16 and an error amplifier 17. The error amplifier 17 detects any change in the voltage at the output terminals of the switching regulator and provides a current whose value is determined by the change in the output voltage. The current from the error amplifier 17 causes the rate generator 15 to develop pulses having a frequency which is determined by the value of the current from the amplifier 17. Pulses from the rate generator cause the trigger generator 14 to develop trigger signals for the switching regulator. The recovery disable circuit 16 senses the time that output current is being delivered by one of the portions of the switching regulator to the output filter capacitors and prevents the rate generator from delivering pulses during the time that this current is being delivered.

The over-current detector 20, the over-voltage detector 21 and the under-voltage detector 22 sense any abnormal values of current or voltage at the output terminals of the switching regulator and provide signals to the fault shutdown circuit 19. When the fault shutdown circuit 19 receives a signal from any of the detectors 20, 21 and 22 it provides a signal to the rate generator which disables the rate generator and prevents any pulses from being supplied to trigger the switching regulator.

SWITCHING REGULATOR

As indicated in FIG. 1, the dual switching regulator 10 includes a pair of switching regulators, each of the pair of regulators having a pair of transformers. The first of the two regulators includes a pair of transformers 24 and 25, each having a primary winding and a secondary winding. The primary windings 28 and 29 are connected in series and are coupled to the high voltage unregulated D.C. power supply which is connected to the input terminals 49 and 50. A pair of silicon controlled rectifiers 38 and 39 control the current supplied by the unregulated D.C. power supply to the primary windings of transformers 24 and 25. The anode of silicon controlled rectifier 38 is connected to the positive terminal 49 of the unregulated D.C. power supply and the cathode of silicon controlled rectifier 38 is connected to the upper end of primary winding 28. The gate of silicon controlled rectifier 38 is connected to one lead of the trigger generator 14 which provides trigger signals to render rectifier 38 conductive. The anode of silicon controlled rectifier 39 is connected to the lower end of primary winding 29 and the cathode of silicon controlled rectifier 39 is connected to the negative terminal 50 of the unregulated D.C. power supply. A second lead from the trigger generator 14 is connected to the gate of silicon controlled rectifier 39 to provide trigger signals to render rectifier 39 conductive. The other half of the dual regulator includes transformers 26 and 27 and silicon controlled rectifiers 40 and 41.

Figure 2:
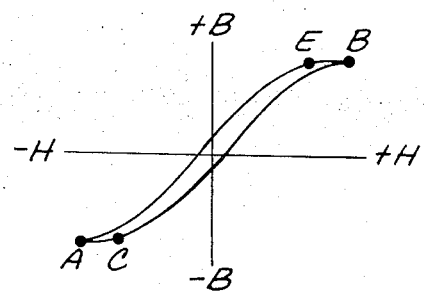
FIG. 2 illustrates a magnetization curve which is useful in explaining the operation of the circuit shown in FIG. 1.

The magnetic core employed in transformers 24–27 provides the magnetization characteristics illustrated in the magnetization curve of FIG. 2. The magnetizing force H is equal to the product of the number of turns in a winding on the transformer core and the number of amperes of current for each turn of wire divided by the length of the core. Since the physical length of a particular transformer core is constant the magnetizing force of the transformer is often expressed as the number of amperes times the number of turns, or "ampere-turns". The flux density B is a number of lines of flux per square centimeter of the transformer core and is determined by the value of magnetizing force and the type of material used in the core. A discussion of the magnetization curves can be found in the textbook "Magnetic Circuits and Transformers" by E.E. Staff, M.I.T., 1943, published by John Wiley & Sons, New York, N.Y.

Figure 3:
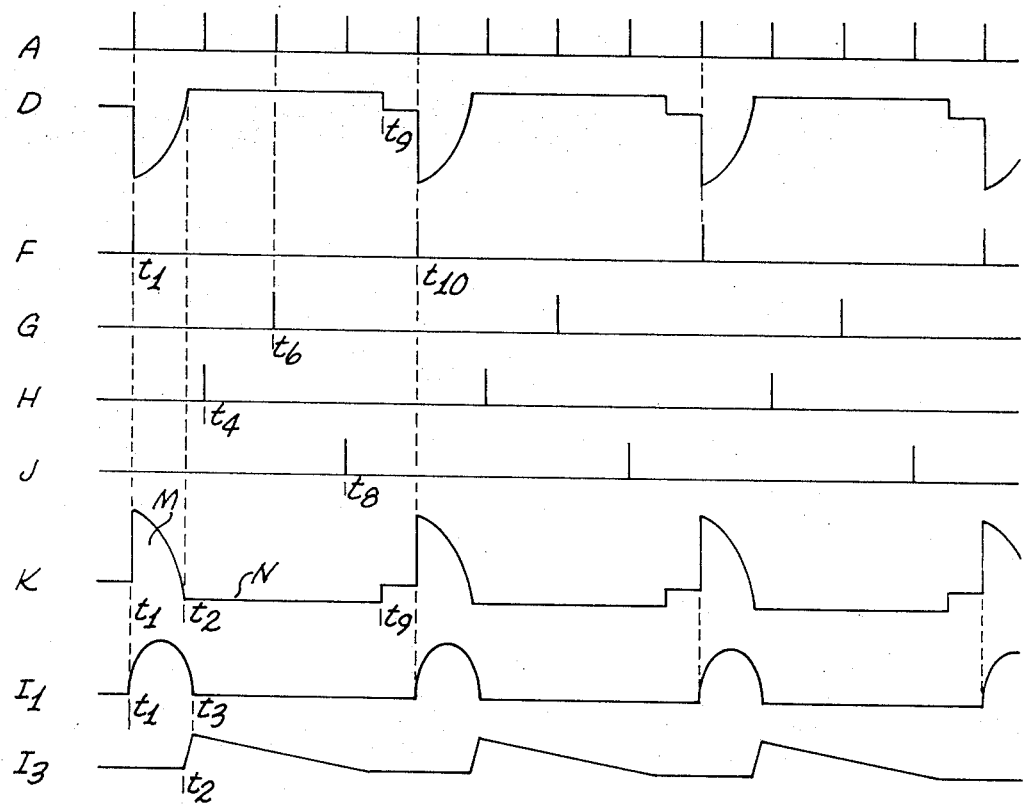
FIG. 3 illustrates waveforms which are useful in explaining the operation of the switching regulator.

The operation of one half of the dual switching regulator of FIG. 1 will now be discussed in connection with the magnetization curve shown in FIG. 2 and the waveforms shown in FIG. 3. It should be understood that the other half of the dual switching regulator operates in a similar manner. It should also be understood that additional sections of the switching regulator may be connected to the circuit shown in FIG. 1.

A pair of capacitors 44 and 45 provide predetermined quantities of electrical energy to the transformers 24 and 25 each time one of the silicon controlled rectifiers 38 and 39 is rendered conductive. Each time one of the silicon controlled rectifiers 38 and 39 is rendered nonconductive the same predetermined quantity of energy is rendered nonconductive the same predetermined quantity of energy is delivered by one of the transformers 24 and 25 through diodes 52 and 53 to a filter capacitor 57. Prior to the time t1 shown in FIG. 3, capacitor 44 of FIG. 1 is charged to the polarity shown in FIG. 1. At time $t1$ a pulse from trigger generator 14 renders silicon controlled rectifier 38 conductive so that the voltage across capacitor 44 is supplied to the primary winding 28 of transformer 24 causing a current I1 to flow from the upper plate of capacitor 44 through anode to cathode of rectifier 38, through the primary winding 28 to the lower plate of capacitor 44.

The current I1 through primary winding 28 causes a change of flux in the transformer core and causes the operating point to move from point A toward point C of the magnetization curve in FIG. 2. This change in flux produces a voltage across primary winding 28, which limits the rate of increase in current through silicon rectifier 38, thus preventing possible damage to rectifier 38. A positive voltage applied to the upper end of primary winding 28 causes the operating point to move from point C to point D. The distance between point C and point D is proportional to the product of the voltage applied to primary winding 28 and the duration of time this voltage is applied.

The voltage applied to primary winding 28 is magnetically coupled through the transformer core to the secondary winding 33. Between time $t1$ and time $t2$ secondary winding 33 has a positive polarity of voltage at the lower end of the winding and a negative polarity of voltage at the upper end of the winding. At this time, the voltage across the secondary winding 33 causes diode 52 to be back biased so that no current flows through the diode or through the secondary winding 33. Capacitor 44 provides current I1 until this capacitor has discharged at time $t2$ as shown in the waveform I1 of FIG. 3. The area M under the curve of waveform K (FIG. 3) between time $t1$ and time $t2$ is the sum of the products of the voltage applied to primary winding 28 and the duration of time the voltage is applied and this area M represents the total energy stored in the core of transformer 24. When the voltage applied to primary winding 28 has a zero value at time t2 the operating point reaches point D.

At time $t2$, the energy stored in the core of transformer 24 reverses the polarity of voltage across each of the transformer windings so that a negative polarity of voltage is developed at the upper end of primary winding 28. This negative polarity of voltage at the upper end of primary winding 28 causes the operating point in FIG. 2 to move from point D toward point E and to begin moving toward point A. Again the distance between point E and point A is proportional to the products of the voltage across primary winding 28 and the duration of time this voltage is applied. The area N under the curve of waveform K between times $t2$ and $t9$ is the sum of the products of the voltage across primary 28 and the time this voltage is applied. This area N represents a total energy which the core of transformer point 24 returns through the transformer. The voltage across primary winding 28 causes current I1 to charge capacitor 44 to a polarity opposite to the polarity shown in FIG. 1.

The energy in the core of transformer 24 causes the voltage across secondary winding 33 to increase to a value larger than the voltage across filter capacitor 57 so that a current I3 flows through diode 52 to charge capacitor 57. The energy which is stored in the core of transformer 24 when silicon controlled rectifier 38 conducts is proportional to the difference between the flux at point A and point D on the magnetization curve of FIG. 3; and the energy which is transferred to the secondary winding 33 when silicon controlled rectifier 38 is rendered nonconductive, is proportional to the difference between the flux at point D and point A. Since the distance between point A through point C to point D shown in FIG. 2 is substantially the same as the distance between point D through point E to point A substantially all the energy which was stored in the core of the transformer between times $t1$ and $t2$ is returned and stored on capacitors 57 and 58. Capacitor 44 delivers substantially the same amount of energy to the transformer each time the silicon controlled rectifier 38 is rendered conductive so that the amount of energy delivered to capacitors 57 and the voltage across these capacitors is determined by the frequency of signals applied to the gate of rectifier 38. Capacitor 45 also provides a predetermined quantity of energy to transformer 25 each time silicon controlled rectifier 39 is rendered conductive. Capacitors 46 and 47 provide predetermined quantitites of energy to transformers 26 and 27 each time that the silicon controlled rectifiers 40 and 41 respectively are rendered conductive.

Prior to time $t6$, capacitor 45 is charged to the polarity shown in FIG. 1. At time $t6$ a pulse from the trigger generator 14 renders silicon controlled rectifier 39 conductive so that current I2 flows from the upper plate of capacitor 45 through the primary winding 29, from anode to cathode of rectifier 39 to the lower plate of capacitor 45. Current I2 through the primary winding and the voltage impressed across this winding cause the operating point of the characteristic curve in FIG. 2 to move from point A through point C to point D and cause a predetermined quantity of energy to be stored in the core of transformer 25. When silicon controlled rectifier 39 is rendered nonconductive, this energy is transferred through the secondary winding 34 causing a current I4 to charge capacitor 57 as described above.

The amount of voltage across capacitors 57 and 58 can be controlled by controlling the frequency of the trigger signals which trigger generator 14 applies to the gates of the silicon controlled rectifiers 38–41. The frequency of the trigger signals is determined by the value of the current applied to the rate generator 15. When an increase in the amount of current drawn by a load (not shown) connected across the output terminals 64 and 65 in FIG. 1 causes the value of the output voltage to fall below a predetermined reference level, the frequency of the signals from trigger generator 14 increases. This increase in the frequency of the output signals causes an increase in the rate of energy delivered to capacitors 57 and 58 and increases the voltage between output terminal 64 and 65 to the predetermined reference level. The voltage at the output terminal 64 of the power supply controls the frequency of the signals from trigger generator 14 so that the voltage at the output terminals 64 and 65 is substantially constant even when the current drawn from this power supply varies over a wide range of values.

LEAD NETWORK

The power supply of FIG. 1 does not regulate well when power is initially applied. The inductance of choke 60 causes the output voltage V0 to rise above the regulated level of voltage and causes possible damage to microcircuits which may be connected to output terminals 64 and 65. The reason for this rise in voltage or overshoot may be seen by referring to FIGS. 1 and 4. When voltage is initially provided to input terminals 49 and 50 of FIG. 1 the voltage between output terminals 64 and 65 is low. The voltage to the input lead of the error amplifier 17 is low which causes amplifier 17 to supply a high value of current to input terminal 63 of the rate generator 15. This high value of current to generator 15 causes the generator to produce pulses having a high frequency so that regulator 10 provides a relatively large amount of current to capacitor 57. The inductance of choke 60 limits the current flowing to capacitor 58 so that the voltage V1, across capacitor 57 increases faster than the voltage V0 across capacitor 58. For example, at time ta of FIG. 4, the voltage V1 is much greater than the voltage V0. When V0 is below the regulated level amplifier 17 continues to provide a high value of current to generator 15 causing generator 15 to produce high frequency pulses. The high frequency pulses cause regulator 10 to continue to provide large amounts of current to capacitor 57 causing voltage V1 to increase above the regulated level.

Figure 4:
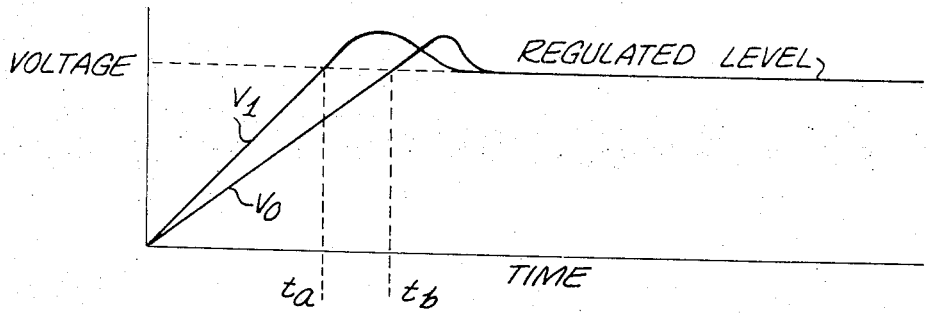
FIGS. 4 and 6 illustrate waveforms which are useful in explaining the operation of the present invention.

At time tb of FIG. 4 output voltage V0 reaches the regulated value causing the current from error amplifier to decrease. However, at this time the voltage V1 across capacitor 57 is above the regulated value. This voltage across capacitor 57 and the inductance of choke 60 cause current to flow to the upper plate of capacitor 58 and to increase voltage V0 above the regulated value. What is needed is a circuit to sense the increasing voltage across capacitor 57 and to decrease the current from error amplifier 17 as voltage V1 approaches the regulated level. Some prior art circuits use a capacitor resistor network between capacitor 57 and the error amplifier to sense this voltage. However, the capacitor-resistor network causes instability in the system so that oscillations may occur in the amplifier and regulator circuit.

Figure 5:
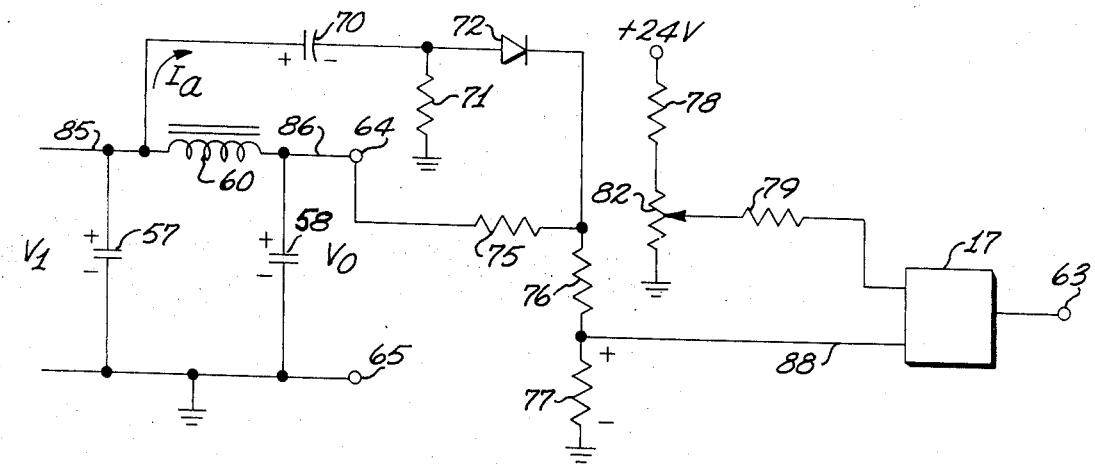
FIG. 5 is a schematic drawing of an embodiment of the present invention.
Figure 6:
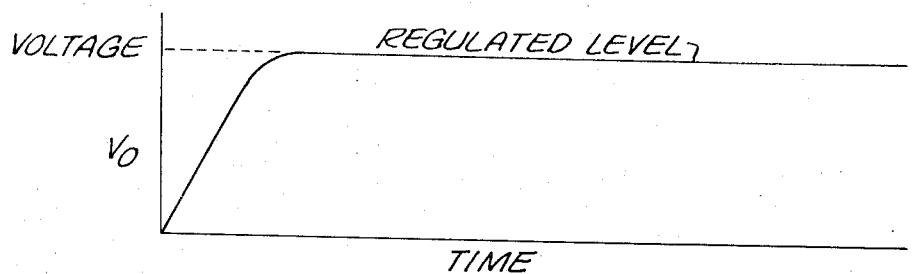

The present lead network alleviates the disadvantages of the prior art by using the circuit shown in FIG. 5. The increasing voltage V1 is coupled by capacitor 70, diode 72 and resistors 71 and 76 to the lower input lead of error amplifier 17. The output voltage V0 is coupled to the lower input of amplifier 17 by resistors 75, 76 and 77. During the time the voltage V1 is increasing, a current $I_a$ flows from the upper plate of capacitor 57 to the left hand plate of capacitor 70 through diode 72 and resistors 76 and 77 to ground. The current through resistor 77 provides a voltage drop across resistor 77. The voltage drop across resistor 77 provides a signal which reduces the current from error amplifier 17 and causes the voltage across capacitor 57 to increase more slowly as voltage V1 approaches the regulated level. This slower increase in voltage V1 prevents overshoot of the output voltage V0. This causes output voltage V0 to increase from a low value to the regulated value as shown in FIG. 6. When capacitor 70 charges to the value of voltage across capacitor 57 current $I_a$ no longer flows. The signal to amplifier 17 is now determined by the value of voltage V0. The value of V0, which is the regulated level of the regulator output, can be controlled by the setting of potentiometer 82. When a single, predetermined value of V0 is desired the upper input lead of amplifier 17 may be connected directly to a reference potential. Potentiometer 82 and resistors 76 and 78 may be removed from the circuit.

While the principles of the invention have now been made clear in an illustrative embodiment, there will be many obvious modifications of the structure, proportions, materials and components without departing from those principles. The appended claims are intended to cover any such modifications.

We claim:

1. A lead network for use with an error amplifier having first and second input leads and with a power supply filter having an input capacitor and an output capacitor, said network comprising:

a diode having an anode and a cathode, said cathode of said diode being coupled to said first input lead of said amplifier;

a coupling capacitor, said coupling capacitor being connected between said anode of said diode and said input capacitor;

first and second reference potentials;

first, second and third resistors, said first resistor being connected between said anode of said diode and said second reference potential, said second resistor being connected between said output capacitor and said cathode of diode, said third resistor being connected between said first input lead of said amplifier and said second potential; and means for coupling said second input lead of said amplifier to said first potential.

2. A lead network as defined in claim 1 wherein said means for coupling includes:

a potentiometer having first and second input leads and an output lead, said first input lead of said potentiometer being coupled to said first potential, said second input lead of said potentiometer being connected to said second potential; said output lead of said potentiometer being coupled to said second input lead of said amplifier.

3. A network for use with an error amplifier having first and second input leads and with a power supply filter having an input capacitor and an output capacitor, said network comprising:

a diode having an anode and a cathode;

a coupling capacitor, said coupling capacitor being connected between said anode of said diode and said input capacitor;

first and second reference potentials;

first, second, third and fourth resistors, said first resistor being connected between said anode of said diode and said second potential, said second resistor being connected between said output capacitor and said cathode of said diode, said third resistor being connected between said first input lead of said amplifier and said second potential, said fourth resistor being connected between said cathode of said diode and said first input lead of said amplifier; and means for coupling said second input lead of said amplifier to said first potential.

4. A lead network as defined in claim 3 wherein said means of coupling include:
a potentiometer having first and second input leads and an output lead, said first input lead of said potentiometer being coupled to said first potential, said second input lead of said potentiometer being connected to said second potential; said output lead of said potentiometer being coupled to said second input lead of said amplifier.

* * * * *